United States Patent
Li et al.

(10) Patent No.: US 11,306,936 B2
(45) Date of Patent: Apr. 19, 2022

(54) METHOD, DEVICE AND NON-TRANSITORY COMPUTER READABLE STORAGE MEDIUM FOR HVAC AND FRESH AIR CONTROL

(71) Applicants: GD MIDEA HEATING & VENTILATING EQUIPMENT CO., LTD., Foshan (CN); MIDEA GROUP CO., LTD., Foshan (CN)

(72) Inventors: Bo Li, Foshan (CN); Yongfeng Xu, Foshan (CN); Meibing Xiong, Foshan (CN); Yongqiang Wan, Foshan (CN); Wentao Shu, Foshan (CN); Xiaolong Qian, Foshan (CN); Rufeng Chen, Foshan (CN)

( * ) Notice: Subject to any disclaimer, the term of this patent is extended or adjusted under 35 U.S.C. 154(b) by 371 days.

(21) Appl. No.: 16/490,590

(22) PCT Filed: Oct. 9, 2017

(86) PCT No.: PCT/CN2017/105414
§ 371 (c)(1),
(2) Date: Sep. 2, 2019

(87) PCT Pub. No.: WO2019/024241
PCT Pub. Date: Feb. 7, 2019

(65) Prior Publication Data
US 2020/0003446 A1    Jan. 2, 2020

(30) Foreign Application Priority Data
Aug. 2, 2017    (CN) .......................... 201710653474.X

(51) Int. Cl.
*F24F 11/49*    (2018.01)
*F24F 11/67*    (2018.01)
(Continued)

(52) U.S. Cl.
CPC .............. *F24F 11/49* (2018.01); *F24F 11/67* (2018.01); *F24F 11/74* (2018.01); *F24F 11/81* (2018.01);
(Continued)

(58) Field of Classification Search
CPC .. F24F 11/49; F24F 11/67; F24F 11/74; F24F 11/81; F24F 2110/10; F24F 2110/40;
(Continued)

(56) References Cited

U.S. PATENT DOCUMENTS 9,501,805 B2 *  11/2016  McLean ................. G06Q 50/06
2010/0286937 A1 * 11/2010  Hedley .................. G05B 15/02
                                                                702/60
(Continued)

FOREIGN PATENT DOCUMENTS

CN      102331065 A    1/2012
CN      103307697 A    9/2013
(Continued)

OTHER PUBLICATIONS

OA for IN application 201927040488.
(Continued)

*Primary Examiner* — Ramesh B Patel
(74) *Attorney, Agent, or Firm* — Kilpatrick Townsend & Stockton, LLP

(57) ABSTRACT

A new fan and an anti-cold air control method and apparatus therefor, the method comprising the following steps: during the process of a new fan switching from a heating mode to a cooling mode, acquiring in real time the set temperature and air supply temperature of the new fan and the middle-portion temperature of the indoor heat exchanger of the new fan (S1); acquiring the current output wind speed and the set wind speed of the new fan (S2); and adjusting the output wind speed of the new fan on the basis of the set tempera-
(Continued)

ture, the air supply temperature, the middle-portion temperature of the indoor heat exchanger, the current output wind speed, and the set wind speed (S3).

9 Claims, 3 Drawing Sheets

(51) Int. Cl.
*F24F 11/74* (2018.01)
*F24F 11/81* (2018.01)
*G05B 15/02* (2006.01)
*F24F 110/40* (2018.01)
*F24F 110/10* (2018.01)
*F24F 140/20* (2018.01)

(52) U.S. Cl.
CPC .......... *G05B 15/02* (2013.01); *F24F 2110/10* (2018.01); *F24F 2110/40* (2018.01); *F24F 2140/20* (2018.01)

(58) Field of Classification Search
CPC .... F24F 2140/20; F24F 2221/54; F24F 11/41; F24F 11/77; F24F 2110/30; G05B 15/02; Y02B 30/70
See application file for complete search history.

(56) References Cited

U.S. PATENT DOCUMENTS

| | | | |
|---|---|---|---|
| 2016/0102882 A1* | 4/2016 | Klenge | F24F 11/30 62/89 |
| 2017/0023264 A1* | 1/2017 | Ha | F24F 1/0003 |
| 2020/0011559 A1* | 1/2020 | Wan | F24F 11/30 |

FOREIGN PATENT DOCUMENTS

| | | |
|---|---|---|
| CN | 106288174 A | 1/2017 |
| CN | 106568170 A | 4/2017 |
| CN | 106839284 A | 6/2017 |
| EP | 2615389 A1 | 7/2013 |
| EP | 2719966 A1 | 4/2014 |
| JP | S56114340 U | 9/1981 |
| JP | H043843 A | 1/1992 |
| JP | H0914735 A | 1/1997 |
| JP | 2002340384 A | 11/2002 |
| JP | 2007040554 A | 2/2007 |

OTHER PUBLICATIONS

OA for CN application 201710653474.X.
OA for EP application 17920183.5.
ISR for PCT application PCTCN 2017105414.

* cited by examiner

METHOD, DEVICE AND NON-TRANSITORY COMPUTER READABLE STORAGE MEDIUM FOR HVAC AND FRESH AIR CONTROL

CROSS-REFERENCES TO RELATED APPLICATIONS

The present disclosure is a national phase application of International Application No. PCT/CN2017/105414, filed on Oct. 9, 2017, which claims priority to and benefits of Chinese Patent Application Serial No. 201710653474.X, filed on Aug. 2, 2017, the entireties of which are herein incorporated by reference.

FIELD

The present disclosure relates to the field of air conditioning technologies, and more particularly, to an anti-cold-air control method for a fresh air machine, a non-transitory computer readable storage medium, an anti-cold-air control device for a fresh air machine, and a fresh air machine.

BACKGROUND

When the fresh air machine is in the process of defrosting during heating, or oil-return operating of switching from the heating mode to the refrigeration mode, the fresh air machine may be controlled to enter the anti-cold-air operation state, to prevent cold air from blowing out.

At present, the related anti-cold-air control schemes for the fresh air machine often follow the scheme of conventional indoor machine of air conditioners. Specifically, the on/off and wind level switching control of the indoor fan are performed according to the temperature value detected by the temperature sensor disposed at the central part of the current indoor heat exchanger. However, the following problems may occur when the above schemes are applied: 1) when the fan is turned off, the temperature value detected by the temperature sensor disposed at the central part may rise rapidly, which may easily enable the anti-cold-air fan to be turned on, after the fan is operating, even when the fan operates in the minimum wind level, it may cause the temperature value detected by the temperature sensor disposed at the central part to decrease rapidly, and cause the fan to turn off, thus causing the fan to turn on or turn off frequently. 2) when the fan is turned on, it is detected that the delivery air temperature is above 37° C. for 10 minutes, the temperature value detected by the temperature sensor disposed at the central part is still low, which makes the fan operating at a low speed for a long time, leading to an increase in the time of switching the wind level.

SUMMARY

The present disclosure aims to solve at least one of the technical problems existing in the related art to at least some extent. Accordingly, an objective of the present disclosure is to provide an anti-cold-air control method for a fresh air machine, which can shorten the time of adjusting the outlet wind speed, reduce the on/off frequency of the fan, and greatly improve the anti-cold wind effect.

A second objective of the present disclosure is to provide a non-transitory computer readable storage medium.

A third objective of the present disclosure is to provide an anti-cold-air control device for a fresh air machine.

A fourth objective of the present disclosure is to provide a fresh air machine.

To achieve the above objectives, embodiments of a first aspect of the present disclosure provide an anti-cold-air control method for a fresh air machine. The method includes: during a process of switching the fresh air machine from a heating mode to a refrigeration mode, obtaining, in real time, a set temperature and a delivery air temperature of the fresh air machine, and an external temperature of an indoor heat exchanger of the fresh air machine; obtaining a current outlet wind speed and a set wind speed of the fresh air machine; and adjusting an outlet wind speed of the fresh air machine based on the set temperature, the delivery air temperature, the external temperature of the indoor heat exchanger, the current outlet wind speed and the set wind speed.

With the anti-cold-air control method for a fresh air machine according to embodiments of the present disclosure, the outlet wind speed of the fresh air machine can be adjusted based on parameters such as the detected set temperature, the delivery air temperature, the external temperature of the indoor heat exchanger of the fresh air machine, the current outlet wind speed and the set wind speed, such that the time of adjusting the outlet wind speed can be shortened, the on/off frequency of the fan can be reduced, and the anti-cold wind effect can be greatly improved.

Moreover, the anti-cold-air control method for a fresh air machine according to above embodiments of the present disclosure may have the following additional technical features.

Specifically, adjusting the outlet wind speed of the fresh air machine based on the set temperature, the delivery air temperature, the external temperature of the indoor heat exchanger, the current outlet wind speed and the set wind speed includes: determining whether a maximum value of the delivery air temperature and the external temperature of the indoor heat exchanger is greater than a first preset temperature value in response to determining that the current outlet wind speed of the fresh air machine is zero; adjusting the outlet wind speed of the fresh air machine to a first wind speed in response to determining that the maximum value of the delivery air temperature and the external temperature of the indoor heat exchanger is greater than the first preset temperature value, in which the first wind speed is greater than zero and less than the set wind speed; determining whether the delivery air temperature is greater than a second preset temperature value in response to determining that the current outlet wind speed of the fresh air machine is the first wind speed, in which the second preset temperature value is greater than the first preset temperature value; and adjusting the outlet wind speed of the fresh air machine to the set wind speed in response to determining that the delivery air temperature is greater than the second preset temperature value.

Furthermore, adjusting the outlet wind speed of the fresh air machine based on the set temperature, the delivery air temperature, the external temperature of the indoor heat exchanger, the current outlet wind speed and the set wind speed includes: determining whether the delivery air temperature is less than a third preset temperature value in response to determining that the current outlet wind speed of the fresh air machine is the set wind speed; adjusting the outlet wind speed of the fresh air machine to the first wind speed in response to determining that the delivery air temperature being less than the third preset temperature value; determining whether the delivery air temperature is less than a fourth preset temperature value in response to determining that the current outlet wind speed of the fresh air machine is the first wind speed, in which the fourth preset temperature value is less than the third preset temperature value; and adjusting the outlet wind speed of the fresh air machine to zero in response to determining that the delivery air temperature is less than the fourth preset temperature value.

Furthermore, the first wind speed is set based on the delivery air temperature and the set temperature. The method further includes: determining whether a difference between the delivery air temperature and the set temperature is less than a first preset difference; determining an outlet wind speed corresponding to a minimum wind level of the fresh air machine as the first wind speed in response to determining that the difference between the delivery air temperature and the set temperature is less than the first preset difference; determining whether the difference between the delivery air temperature and the set temperature is less than or equal to a second preset difference in response to determining that the difference between the delivery air temperature and the set temperature is greater than or equal to the first preset difference, in which the second preset difference is greater than the first preset difference; determining that a wind level corresponding to the first wind speed is two levels less than a wind level corresponding to the set wind speed in response to determining that the difference between the delivery air temperature and the set temperature is less than or equal to the second preset difference; determining that the wind level corresponding to the first wind speed is one level less than the wind level corresponding to the set wind speed in response to determining that the difference between the delivery air temperature and the set temperature is greater than the second preset difference.

To achieve the above objectives, embodiments of a second aspect of the present disclosure provide a non-transitory computer readable storage medium having stored thereon computer programs that, when executed by a processor, cause the method anti-cold-air control method for a fresh air machine according to embodiments of the first aspect of the present disclosure to be implemented.

With the non-transitory computer readable storage medium according to embodiments of the present disclosure, by performing the stored computer programs, the time of adjusting the outlet wind speed can be shortened, the on/off frequency of the fan can be reduced, and the anti-cold wind effect can be greatly improved.

To achieve the above objectives, embodiments of a third aspect of the present disclosure provide an anti-cold-air control device for a fresh air machine. The device includes: a temperature obtaining module, a wind speed obtaining module, and a wind speed adjusting module. The temperature obtaining module is configured to, during a process of switching the fresh air machine from a heating mode to a refrigeration mode, obtain, in real time, a set temperature and a delivery air temperature of the fresh air machine, and an external temperature of an indoor heat exchanger of the fresh air machine. The wind speed obtaining module is configured to obtain a current outlet wind speed and a set wind speed of the fresh air machine. The wind speed adjusting module is configured to adjust an outlet wind speed of the fresh air machine based on the set temperature, the delivery air temperature, the external temperature of the indoor heat exchanger, the current outlet wind speed and the set wind speed.

With the anti-cold-air control device for a fresh air machine according to embodiments of the present disclosure, the wind speed adjusting module can adjust the outlet wind speed of the fresh air machine based on the set temperature and the delivery air temperature of the fresh air machine, and the external temperature of the indoor heat exchanger obtained by the temperature obtaining module, and the current outlet wind speed and the set wind speed of the fresh air machine obtained by the wind speed obtaining module, thus the time of adjusting the outlet wind speed can be shortened, the on/off frequency of the fan can be reduced, and the anti-cold wind effect can be greatly improved.

Moreover, the anti-cold-air control device for a fresh air machine according to above embodiments of the present disclosure may have the following additional technical features.

Specifically, the wind speed adjusting module is configured to: determine whether a maximum value of the delivery air temperature and the external temperature of the indoor heat exchanger is greater than a first preset temperature value in response to determining that the current outlet wind speed of the fresh air machine is zero; adjust the outlet wind speed of the fresh air machine to a first wind speed in response to determining that the maximum value of the delivery air temperature and the external temperature of the indoor heat exchanger is greater than the first preset temperature value; determine whether the delivery air temperature is greater than a second preset temperature value in response to determining that the current outlet wind speed of the fresh air machine is the first wind speed; and adjust the outlet wind speed of the fresh air machine to the set wind speed in response to determining that the delivery air temperature is greater than the second preset temperature value. The first wind speed is greater than zero and less than the set wind speed, and the second preset temperature value is greater than the first preset temperature value.

Further, the wind speed adjusting module is configured to: determine whether the delivery air temperature is less than a third preset temperature value in response to determining that the current outlet wind speed of the fresh air machine is the set wind speed; adjust the outlet wind speed of the fresh air machine to the first wind speed in response to determining that the delivery air temperature is less than the third preset temperature value; determine whether the delivery air temperature is less than a fourth preset temperature value in response to determining that the current outlet wind speed of the fresh air machine is the first wind speed; and adjust the outlet wind speed of the fresh air machine to zero in response to determining that the delivery air temperature is less than the fourth preset temperature value. The fourth preset temperature value is less than the third preset temperature value.

Further, the wind speed adjusting module is configured to set the first wind speed based on the delivery air temperature and the set temperature. The wind speed adjusting module is configured to: determine whether a difference between the delivery air temperature and the set temperature is less than a first preset difference; determine an outlet wind speed corresponding to a minimum wind level of the fresh air machine as the first wind speed in response to determining that the difference between the delivery air temperature and the set temperature is less than the first preset difference; determine whether the difference between the delivery air temperature and the set temperature is less than or equal to a second preset difference in response to determining that the difference between the delivery air temperature and the set temperature is greater than or equal to the first preset difference, in which the second preset difference is greater than the first preset difference; determine that a wind level corresponding to the first wind speed is two levels less than a wind level corresponding to the set wind speed in response to determining that the difference between the delivery air temperature and the set temperature is less than or equal to the second preset difference; and determine that the wind level corresponding to the first wind speed is one level less than the wind level corresponding to the set wind speed in response to determining that the difference between the delivery air temperature and the set temperature is greater than the second preset difference.

To achieve the above objectives, embodiments of a fourth aspect of the present disclosure provide a fresh air machine. The fresh air machine includes the anti-cold-air control device for a fresh air machine according to embodiments of the second aspect of the present disclosure.

With the fresh air machine according to embodiments of the present disclosure, the time of adjusting the outlet wind speed can be shortened, the on/off frequency of the fan can be reduced, and the anti-cold wind effect can be greatly improved.

DETAILED DESCRIPTION OF THE INVENTION

Figure 1:
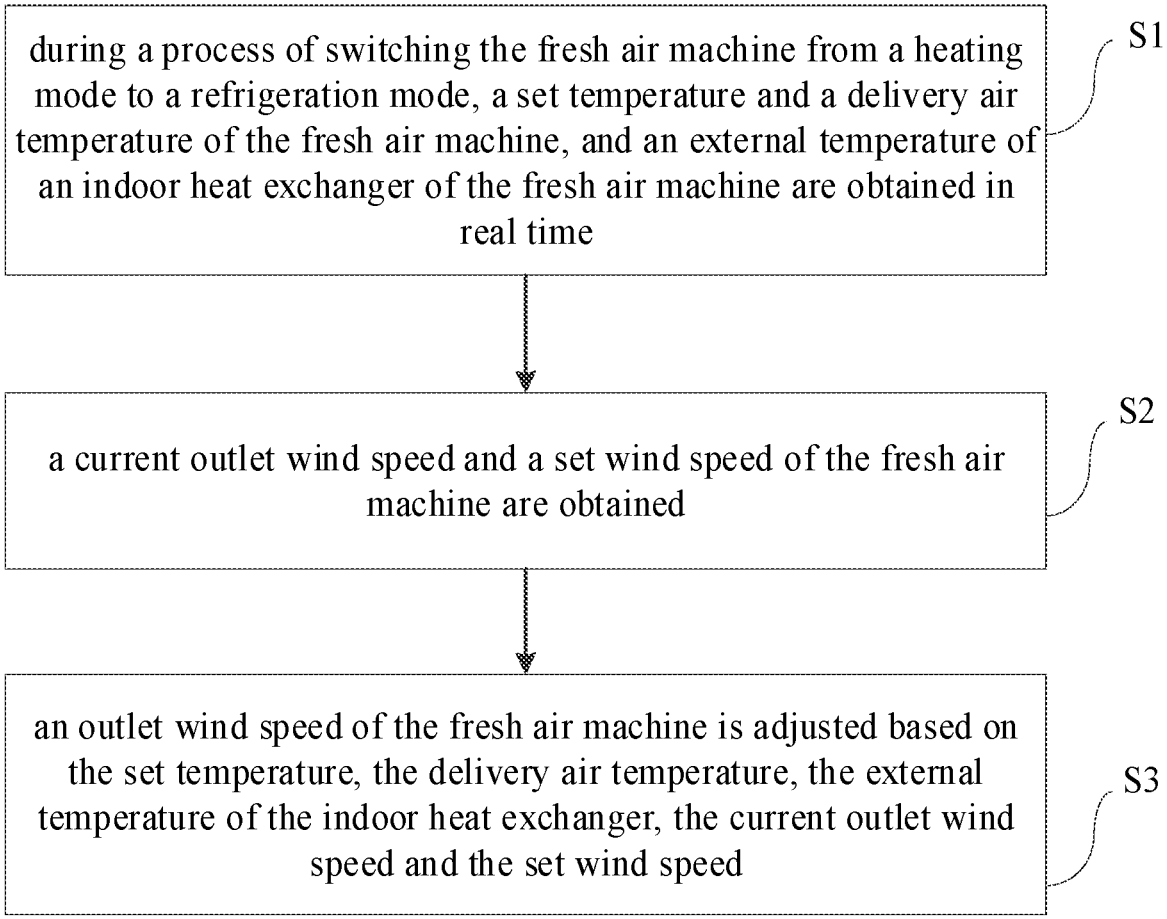
FIG. 1 is a flow chart of an anti-cold-air control device for a fresh air machine according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are exemplary, which are used to explain the present disclosure, and shall not be construed to limit the present disclosure.

The anti-cold-air control method for a fresh air machine, the anti-cold-air control device for a fresh air machine, and the fresh air machine according to embodiments of the present disclosure will now be illustrated with reference to accompanying drawing as follows.

FIG. 1 is a flow chart of an anti-cold-air control device for a fresh air machine according to an embodiment of the present disclosure.

As illustrated in FIG. 1, the method according the embodiment of the present disclosure may include the followings.

At block S1, during a process of switching the fresh air machine from a heating mode to a refrigeration mode, a set temperature $T_S$ and a delivery air temperature $T_A$ of the fresh air machine, and an external temperature T2 of an indoor heat exchanger of the fresh air machine are obtained in real time.

Specifically, when the fresh air machine is in the process of defrosting during heating, or oil-return operating of switching from the heating mode to the refrigeration mode, the set temperature $T_S$ set by the user through an operation panel or a remote control may be obtained, the external temperature T2 of the indoor heat exchanger of the fresh air machine may be obtained through a temperature sensor disposed at a central part of the indoor heat exchanger, and the delivery air temperature $T_A$ may be obtained by a delivery air temperature sensor.

At block S2, a current outlet wind speed and a set wind speed of the fresh air machine are obtained.

In an embodiment of the present disclosure, the set wind speed set by the user through the operation panel or the remote control can be obtained and stored for calling in the subsequent control process. The set wind speed may be set by a stepped wind speed level. For example, the user may select $1^{st}$ level, $2^{nd}$ level, $3^{rd}$ level, . . . , or $n^{th}$ level through the remote control, and set the set wind speed to the wind speed corresponding to the $1^{st}$ level, $2^{nd}$ level, $3^{rd}$ level, . . . , or $n^{th}$ level. The set wind speed may also be set by the stepless wind speed value. For example, the user may set the percentage value by the remote control, and set the set wind speed to a certain percentage of the maximum allowable wind speed.

To achieve an objective of the present disclosure, in an embodiment of the present disclosure, the set wind speed set by the user through the operation panel or the remote control may be different from the current outlet wind speed of the fresh air machine.

At block S3, an outlet wind speed of the fresh air machine is adjusted based on the set temperature $T_S$, the delivery air temperature $T_A$, the external temperature T2 of the indoor heat exchanger, the current outlet wind speed and the set wind speed.

Figure 2:
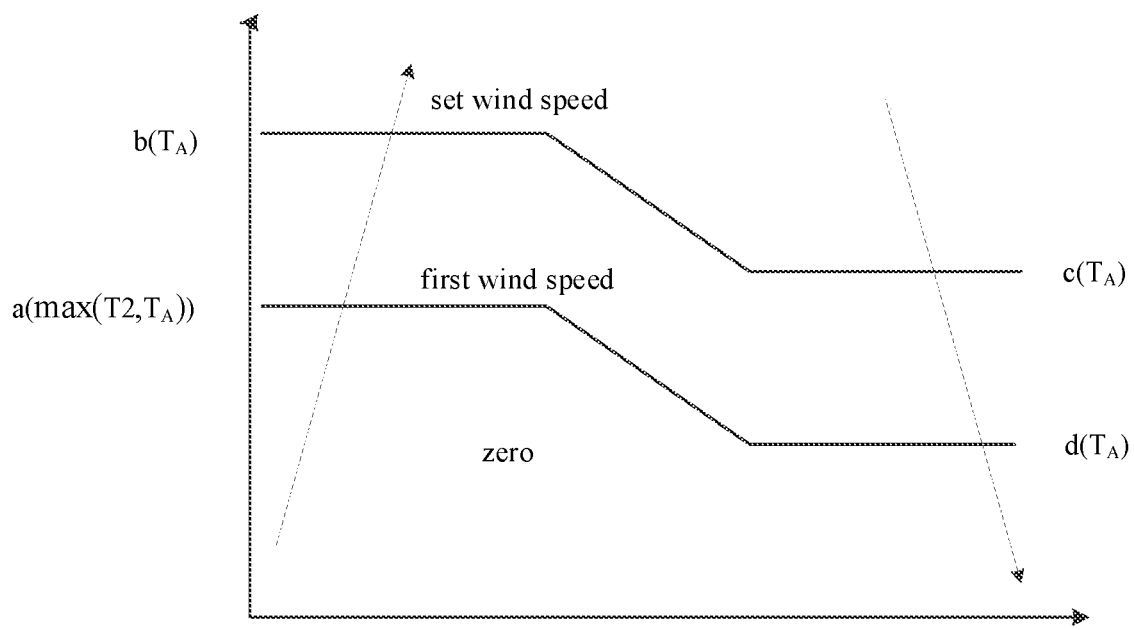
FIG. 2 is a schematic diagram of a process of adjusting an outlet wind speed of a fresh air machine according to an embodiment of the present disclosure.

Specifically, as shown in FIG. 2, when the current outlet wind speed of the fresh air machine is zero (i.e., when the fan is off), a maximum value max(T2, $T_A$) of the delivery air temperature $T_A$ and the external temperature T2 of the indoor heat exchanger may be taken as a judgment condition. In detail, it can be determined whether the maximum value max(T2, $T_A$) of the delivery air temperature $T_A$ and the external temperature T2 of the indoor heat exchanger is greater than a first preset temperature value a. When the maximum value max(T2, $T_A$) of the delivery air temperature $T_A$ and the external temperature T2 of the indoor heat exchanger is greater than the first preset temperature value a, the outlet wind speed of the fresh air machine may be adjusted to a first wind speed. The first wind speed is greater than zero and less than the set wind speed.

As shown in FIG. 2, when the current outlet wind speed of the fresh air machine is the first wind speed, the delivery air temperature $T_A$ may be taken as a judgment condition. In detail, it can be determined whether the delivery air temperature $T_A$ is greater than a second preset temperature value b. When the delivery air temperature $T_A$ is greater than the second preset temperature value b, the outlet wind speed of the fresh air machine may be adjusted to the set wind speed. The second preset temperature value is greater than the first preset temperature value.

As shown in FIG. 2, when the current outlet wind speed of the fresh air machine is the set wind speed, the delivery air temperature $T_A$ may be taken as a judgment condition. In detail, it can be determined whether the delivery air temperature $T_A$ is less than a third preset temperature value c. When the delivery air temperature $T_A$ is less than the third preset temperature value c, the outlet wind speed of the fresh air machine may be adjusted to the first wind speed.

As shown in FIG. 2, when the current outlet wind speed of the fresh air machine is the first wind speed, the delivery air temperature $T_A$ may be taken as a judgment condition. In detail, it can be determined whether the delivery air temperature $T_A$ is less than a fourth preset temperature value d. When the delivery air temperature $T_A$ is less than the fourth preset temperature value d, the outlet wind speed of the fresh air machine may be adjusted to zero, i.e., the fan stops running. The fourth preset temperature value d is less than the third preset temperature value c.

In an embodiment of the present disclosure, the outlet wind speed of the fresh air machine may be adjusted by changing the wind level. In an embodiment of the present disclosure, the first wind speed may be set based on the delivery air temperature $T_A$ and the set temperature $T_S$. In detail, it can be determined whether a difference $\Delta(T_A-T_S)$ between the delivery air temperature $T_A$ and the set temperature $T_S$ is less than a first preset difference. When the difference $\Delta(T_A-T_S)$ between the delivery air temperature $T_A$ and the set temperature $T_S$ is less than the first preset difference, the first wind speed may be set as an outlet wind speed corresponding to a minimum wind level of the fresh air machine. When the difference $\Delta(T_A-T_S)$ between the delivery air temperature $T_A$ and the set temperature $T_S$ is greater than or equal to the first preset difference, it can be further determined whether the difference $\Delta(T_A-T_S)$ between the delivery air temperature $T_A$ and the set temperature $T_S$ is less than or equal to a second preset difference. When the difference $\Delta(T_A-T_S)$ between the delivery air temperature $T_A$ and the set temperature $T_S$ is less than or equal to the second preset difference, it is determined that a wind level corresponding to the first wind speed is two levels less than a wind level corresponding to the set wind speed. When the difference $\Delta(T_A-T_S)$ between the delivery air temperature $T_A$ and the set temperature $T_S$ is greater than the second preset difference, it is determined that the wind level corresponding to the first wind speed is one level less than the wind level corresponding to the set wind speed. The second preset difference is less than the first preset difference.

For example, as shown in Table 1, the first preset difference may be 4° C., and the second preset difference may be 6° C. When the difference $\Delta(T_A-T_S)$ between the delivery air temperature $T_A$ and the set temperature $T_S$ is less than 4° C., the wind level corresponding to the first wind speed may be the minimum wind level. When the difference $\Delta(T_A-T_S)$ between the delivery air temperature $T_A$ and the set temperature $T_S$ is greater than or equal to 4° C. and less than or equal to 6° C., the wind level corresponding to the first wind speed may be two levels less than the wind level corresponding to the set wind speed. When the difference $\Delta(T_A-T_S)$ between the delivery air temperature $T_A$ and the set temperature $T_S$ is greater than 6° C., the wind level corresponding to the first wind speed is one level less than the wind level corresponding to the set wind speed.

| | range of $\Delta(T_A-T_S)$ (° C.) | | |
|---|---|---|---|
| | $\Delta < 4$ | $4 \leq \Delta \leq 6$ | $\Delta > 6$ |
| wind level corresponding to first wind speed | minimum wind level | two levels less than wind level corresponding to set wind speed | one level less than wind level corresponding to set wind speed |

It should be noted that, as a critical value for adjusting the outlet wind speed, the first preset temperature a, the second preset temperature b, the third preset temperature c, and the fourth preset temperature d mentioned above are variable, they may be adjusted by external input devices (such as wire controllers) according to different regions' climate and user needs.

With the anti-cold-air control method for a fresh air machine according to embodiments of the present disclosure, the outlet wind speed of the fresh air machine can be adjusted based on parameters such as the detected set temperature, the delivery air temperature, the external temperature of the indoor heat exchanger of the fresh air machine, the current outlet wind speed and the set wind speed, such that the time of adjusting the outlet wind speed can be shortened, the on/off frequency of the fan can be reduced, and the anti-cold wind effect can be greatly improved.

Corresponding to above embodiments, the present disclosure further provides a non-transitory computer readable storage medium.

The non-transitory computer readable storage medium according to embodiments of the present disclosure stores computer programs, and when the programs is executed by a processor, cause the method anti-cold-air control method for a fresh air machine according to the above embodiments of the first aspect of the present disclosure to be implemented.

With the non-transitory computer readable storage medium according to embodiments of the present disclosure, by performing the stored computer programs, the time of adjusting the outlet wind speed can be shortened, the on/off frequency of the fan can be reduced, and the anti-cold wind effect can be greatly improved.

To implement the anti-cold-air control method for a fresh air machine according to the above embodiments, the present disclosure further provides an anti-cold-air control device for a fresh air machine.

Figure 3:
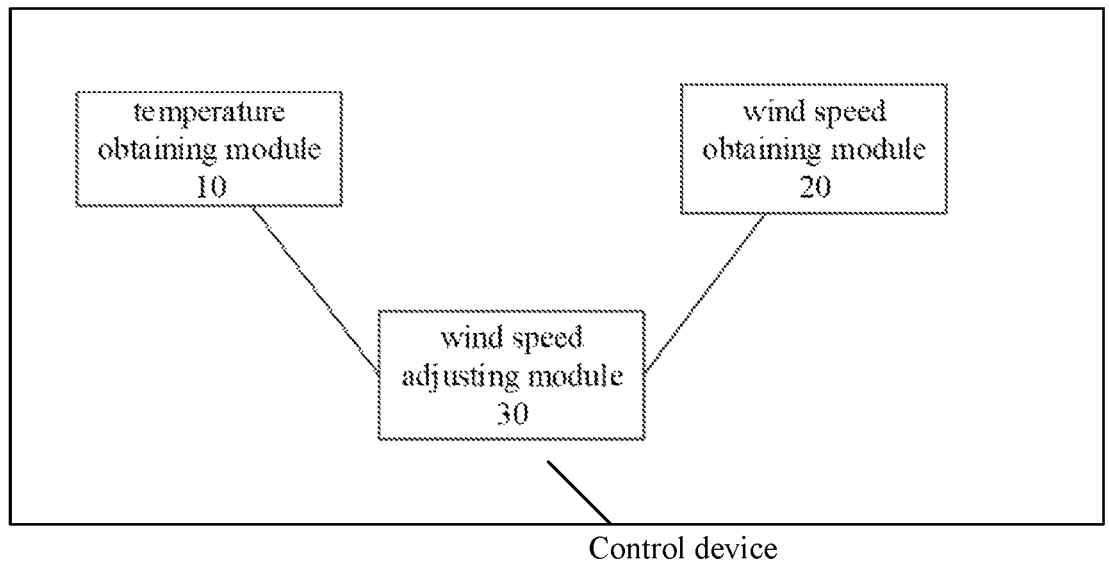
FIG. 3 is a block diagram of an anti-cold-air control device for a fresh air machine according to an embodiment of the present disclosure.
Figure 4:
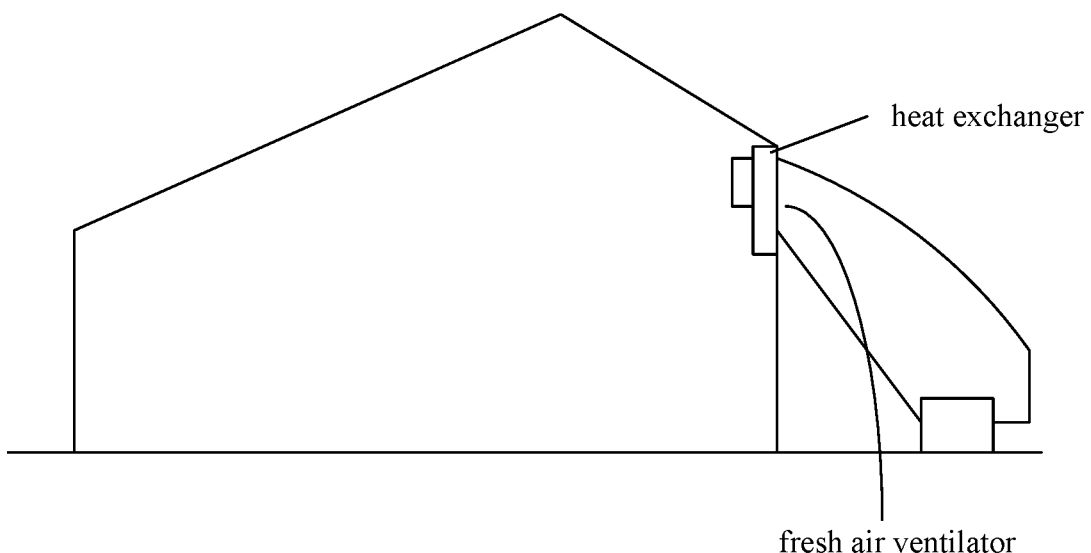
FIG. 4 is a diagram of a fresh air ventilator according to an embodiment of the present discourse.

As illustrated in FIG. 3, the anti-cold-air control device for a fresh air machine according to embodiments of the present disclosure may include a temperature obtaining module 10, a wind speed obtaining module 20, and a wind speed adjusting module 30.

The temperature obtaining module 10 is configured to, during a process of switching the fresh air machine from a heating mode to a refrigeration mode, obtain, in real time, a set temperature $T_S$ and a delivery air temperature $T_A$ of the fresh air machine, and an external temperature T2 of an indoor heat exchanger of the fresh air machine. The wind speed obtaining module 20 is configured to obtain a current outlet wind speed and a set wind speed of the fresh air machine. The wind speed adjusting module 30 is configured to adjust an outlet wind speed of the fresh air machine based on the set temperature $T_S$, the delivery air temperature $T_A$, the external temperature T2 of the indoor heat exchanger, the current outlet wind speed and the set wind speed.

In an embodiment of the present disclosure, after the wind speed obtaining module 20 obtains the set wind speed set by the user through the operation panel or the remote control, the set wind speed may be stored for calling in in the subsequent control process. The set wind speed may be set by a stepped wind speed level. For example, the user may select $1^{st}$ level, $2^{nd}$ level, $3^{rd}$ level, . . . , or $n^{th}$ level through the remote control, and set the set wind speed to the wind speed corresponding to the $1^{st}$ level, $2^{nd}$ level, $3^{rd}$ level, . . . , or $n^{th}$ level. The set wind speed may also be set by the stepless wind speed value. For example, the user may set the percentage value by the remote control, and set the set wind speed to a certain percentage of the maximum allowable wind speed.

To achieve an objective of the present disclosure, in an embodiment of the present disclosure, the set wind speed set by the user through the operation panel or the remote control may be different from the current outlet wind speed of the fresh air machine.

In an embodiment of the present disclosure, when the current outlet wind speed of the fresh air machine obtained by the wind speed obtaining module 20 is zero (i.e., when the fan is off), a maximum value max(T2, $T_A$) of the delivery air temperature $T_A$ and the external temperature T2 of the indoor heat exchanger obtained by the temperature obtaining module 10 may be taken as a judgment condition. In detail, the wind speed adjusting module 30 may determine whether the maximum value max(T2, $T_A$) of the delivery air temperature $T_A$ and the external temperature T2 of the indoor heat exchanger obtained by the temperature obtaining module 10 is greater than a first preset temperature value a. When the maximum value max(T2, $T_A$) of the delivery air temperature $T_A$ and the external temperature T2 of the indoor heat exchanger is greater than the first preset temperature value a, the wind speed adjusting module 30 may adjust the outlet wind speed of the fresh air machine to a first wind speed. The first wind speed is greater than zero and less than the set wind speed.

When the current outlet wind speed of the fresh air machine obtained by the wind speed obtaining module 20 is the first wind speed, the delivery air temperature $T_A$ obtained by the temperature obtaining module 10 may be taken as a judgment condition. In detail, the wind speed adjusting module 30 may determine whether the delivery air temperature $T_A$ is greater than a second preset temperature value b. When the delivery air temperature $T_A$ is greater than the second preset temperature value b, the wind speed adjusting module 30 may adjust the outlet wind speed of the fresh air machine to the set wind speed. The second preset temperature value is greater than the first preset temperature value.

When the current outlet wind speed of the fresh air machine obtained by the wind speed obtaining module 20 is the set wind speed, the delivery air temperature $T_A$ obtained by the temperature obtaining module 10 may be taken as a judgment condition. In detail, the wind speed adjusting module 30 may determine whether the delivery air temperature $T_A$ obtained by the temperature obtaining module 10 is less than a third preset temperature value c. When the delivery air temperature $T_A$ is less than the third preset temperature value c, the wind speed adjusting module 30 may adjust the outlet wind speed of the fresh air machine to the first wind speed.

When the current outlet wind speed of the fresh air machine obtained by the wind speed obtaining module 20 is the first wind speed, the delivery air temperature $T_A$ obtained by the temperature obtaining module 10 may be taken as a judgment condition. In detail, the wind speed adjusting module 30 may determine whether the delivery air temperature $T_A$ is less than a fourth preset temperature value d. When the delivery air temperature $T_A$ is less than the fourth preset temperature value d, the wind speed adjusting module 30 may adjust the outlet wind speed of the fresh air machine to zero, i.e., the fan stops running. The fourth preset temperature value is less than the third preset temperature value.

In an embodiment of the present disclosure, the outlet wind speed of the fresh air machine may be adjusted by changing the wind level. In an embodiment of the present disclosure, the first wind speed may be set based on the delivery air temperature $T_A$ and the set temperature $T_S$. In detail, the wind speed adjusting module 30 may determine whether a difference $\Delta(T_A-T_S)$ between the delivery air temperature $T_A$ and the set temperature $T_S$ is less than a first preset difference. When the difference $\Delta(T_A-T_S)$ between the delivery air temperature $T_A$ and the set temperature $T_S$ is less than the first preset difference, the first wind speed may be set as an outlet wind speed corresponding to a minimum wind level of the fresh air machine. When the difference $\Delta(T_A-T_S)$ between the delivery air temperature $T_A$ and the set temperature $T_S$ is greater than or equal to the first preset difference, the wind speed adjusting module 30 may determine whether the difference $\Delta(T_A-T_S)$ between the delivery air temperature $T_A$ and the set temperature $T_S$ is less than or equal to a second preset difference. When the difference $\Delta(T_A-T_S)$ between the delivery air temperature $T_A$ and the set temperature $T_S$ is less than or equal to the second preset difference, it is determined that a wind level corresponding to the first wind speed is two levels less than a wind level corresponding to the set wind speed. When the difference $\Delta(T_A-T_S)$ between the delivery air temperature $T_A$ and the set temperature $T_S$ is greater than the second preset difference, it is determined that the wind level corresponding to the first wind speed is one level less than the wind level corresponding to the set wind speed. The second preset difference is less than the first preset difference.

For example, as shown in Table 1, the first preset difference may be 4° C., and the second preset difference may be 6° C. When the wind speed adjusting module 30 determines that the difference $\Delta(T_A-T_S)$ between the delivery air temperature $T_A$ and the set temperature $T_S$ is less than 4° C., the wind level corresponding to the first wind speed may be the minimum wind level. When the wind speed adjusting module 30 determines that the difference $\Delta(T_A-T_S)$ between the delivery air temperature $T_A$ and the set temperature $T_S$ is greater than or equal to 4° C. and less than or equal to 6° C., the wind level corresponding to the first wind speed may be two levels less than the wind level corresponding to the set wind speed. When the wind speed adjusting module 30 determines that the difference $\Delta(T_A-T_S)$ between the delivery air temperature $T_A$ and the set temperature $T_S$ is greater than 6° C., the wind level corresponding to the first wind speed is one level less than the wind level corresponding to the set wind speed.

It should be noted that, as a critical value for adjusting the outlet wind speed, the first preset temperature a, the second preset temperature b, the third preset temperature c, and the fourth preset temperature d mentioned above are variable, they may be adjusted by external input devices (such as wire controllers) according to different regions' climate and user needs.

With the anti-cold-air control device for a fresh air machine according to embodiments of the present disclosure, the wind speed adjusting module may adjust the outlet wind speed of the fresh air machine based on the set temperature and the delivery air temperature of the fresh air machine, and the external temperature of the indoor heat exchanger obtained by the temperature obtaining module, and the current outlet wind speed and the set wind speed of the fresh air machine obtained by the wind speed obtaining module, thus the time of adjusting the outlet wind speed can be shortened, the on/off frequency of the fan can be reduced, and the anti-cold wind effect can be greatly improved.

Corresponding to above embodiments, the present disclosure further provides a fresh air machine.

The fresh air machine according to an embodiment of the present disclosure includes the anti-cold-air control device for a fresh air machine provided by the above-mentioned embodiments of the present disclosure. For detailed implementation manners, reference may be made to the foregoing embodiments, and to avoid redundancy, details are not described herein.

With the fresh air machine according to embodiments of the present disclosure, the time of adjusting the outlet wind speed can be shortened, the on/off frequency of the fan can be reduced, and the anti-cold wind effect can be greatly improved.

In the description of the present disclosure, it should be understood that, terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "peripheral" should be construed to refer to the orientation as then described or as shown in the drawings under discussion. These relative terms are for convenience of description and do not require that the present disclosure be constructed or operated in a particular orientation, therefore cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly includes one or more of the features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment," "an example," "a specific example," or "some examples" means that a particular feature, structure, material, or characteristic described in connection with the embodiment or example are included in at least one embodiment or example of the present disclosure. In the specification, expressions of the above terms do not need for same embodiments or examples. Furthermore, the feature, structure, material, or characteristic described can be incorporated in a proper way in any one or more embodiments or examples. In addition, under non-conflicting condition.

Although explanatory embodiments have been shown and described, it would be appreciated that the above embodiments are exemplary and cannot be construed to limit the present disclosure, and changes, amendments, alternatives and modifications can be made.

What is claimed is:

1. A control method for a fresh air ventilator comprising an indoor heat exchanger facilitating heat exchange between outdoor and indoor air where the fresh air ventilator is located, comprises:

determining a process of switching the indoor heat exchanger from a heating mode to a refrigeration mode has been initiated by user;

in response to the process of switching, obtaining a set temperature by the user, a temperature of air delivered by the fresh air ventilator, and an external temperature of the indoor heat exchanger;

obtaining a current speed of the air delivered by the fresh air ventilator, and a set speed of the fresh air ventilator by the user;

in response to determination that the current speed of the air delivered by the fresh air ventilator is zero, selecting a larger one of the temperature value of the air delivered by the fresh air ventilator and the external temperature value of the indoor heat exchanger, and determining the selected value is greater than a first preset temperature;

in response to determination that the selected value is greater than the first preset temperature, adjusting the speed of the air delivered by fresh air ventilator to a first speed, wherein the first speed is greater than zero and less than the set speed;

in response to determination that the current speed of the air delivered by the fresh air ventilator is the first speed, determining whether the temperature of the air delivered by the fresh air ventilator is greater than a second preset temperature, wherein the second preset temperature is greater than the first preset temperature; and in response to determination that the temperature of the air delivered by the fresh air ventilator is greater than the second preset temperature, adjusting the speed of the air delivered by the fresh air ventilator to the set speed.

2. The control method of claim 1, further comprises:

in response to determination that the current speed of the air delivered by the fresh air ventilator is the set speed, determining whether the temperature of the air delivered by the fresh air ventilator is less than a third preset temperature value;

in response to determination that the temperature of the air delivered by the fresh air ventilator is less than the third preset temperature value, adjusting the speed of the air delivered by the fresh air ventilator to the first speed;

in response to determination that the speed of the air delivered by the fresh air ventilator is the first speed, determining whether the temperature of the air delivered by the fresh air ventilator is less than a fourth preset temperature value, wherein the fourth preset temperature value is less than the third preset temperature value; and in response to determination that the temperature of the air delivered by the fresh air ventilator is less than a fourth preset temperature value, adjusting the speed of the air delivered by the fresh air ventilator to zero.

3. The control method of claim 1, wherein the first speed is determined based on the temperature of the air delivered by the fresh air ventilator and the set temperature by following steps:
  determining whether a difference between the temperature of the air delivered by the fresh air ventilator and the set temperature is less than a first preset difference;
  in response to determination that the difference between the temperature of the air delivered by the fresh air ventilator and the set temperature is less than the first preset difference, selecting the speed of the air delivered by the fresh air ventilator corresponding to a minimum speed level of the fresh air ventilator as the first speed;
  in response to determination that the difference between the temperature of the air delivered by the fresh air ventilator and the set temperature is greater than or equal to the first preset difference, determining whether the difference between the temperature of the air delivered by the fresh air ventilator and the set temperature is less than or equal to a second preset difference, wherein the second preset difference is greater than the first preset difference;
  in response to determination that the difference between the temperature of the air delivered by the fresh air ventilator and the set temperature is less than or equal to a second preset difference, determining that a speed level corresponding to the first speed is two levels lower than a speed level corresponding to the set speed;
  in response to determination that the difference between the temperature of the air delivered by the fresh air ventilator and the set temperature is greater than the second preset difference, determining that the speed level corresponding to the first speed is one level lower than the speed level corresponding to the set speed.

4. A non-transitory computer readable storage medium having stored thereon computer programs that, when executed by a processor, performs a control method for a fresh air ventilator comprising an indoor heat exchanger facilitating heat exchange between outdoor and indoor air where the fresh air ventilator is located, the control method comprises:
  determining a process of switching the indoor heat exchanger from a heating mode to a refrigeration mode has been initiated by user;
  in response to the process of switching, obtaining a set temperature by the user, a temperature of air delivered by the fresh air ventilator, and an external temperature of the indoor heat exchanger;
  obtaining a current speed of the air delivered by the fresh air ventilator, and a set speed of the fresh air ventilator by the user;
  in response to determination that the current speed of the air delivered by the fresh air ventilator is zero, selecting a larger one of the temperature value of the air delivered by the fresh air ventilator and the external temperature value of the indoor heat exchanger, and determining the selected value is greater than a first preset temperature; in response to determination that the selected value is greater than the first preset temperature, adjusting the speed of the air delivered by fresh air ventilator to a first speed, wherein the first speed is greater than zero and less than the set speed;
  in response to determination that the current speed of the air delivered by the fresh air ventilator is the first speed, determining whether the temperature of the air delivered by the fresh air ventilator is greater than a second preset temperature, wherein the second preset temperature is greater than the first preset temperature; and
  in response to determination that the temperature of the air delivered by the fresh air ventilator is greater than the second preset temperature, adjusting the speed of the air delivered by the fresh air ventilator to the set speed.

5. A control device for a fresh air ventilator comprising an indoor heat exchanger facilitating heat exchange between outdoor and indoor air where the fresh air ventilator is located, comprising:
  a temperature obtaining module, configured to, during a process of switching the indoor heat exchanger from a heating mode to a refrigeration mode, obtain a set temperature by the user, a temperature of air delivered by the fresh air ventilator, and an external temperature of the indoor heat exchanger;
  a speed obtaining module, configured to obtain a current speed of the air delivered by the fresh air ventilator and a set speed of the fresh air ventilator by the user; and
  a speed adjusting module, configured to adjust the speed of the air delivered by the fresh air ventilator based on the set temperature, the temperature of the air delivered by the fresh air ventilator, the external temperature of the indoor heat exchanger, the current speed of the air delivered by the fresh air ventilator and the set speed;
  the control device is configured for:
  in response to determination that the current speed of the air delivered by the fresh air ventilator is zero, selecting a larger one of the temperature value of the air delivered by the fresh air ventilator and the external temperature value of the indoor heat exchanger, and determining the selected value is greater than a first preset temperature; and
  in response to determination that the current speed of the air delivered by the fresh air ventilator is the first speed, determining whether the temperature of the air delivered by the fresh air ventilator is greater than a second preset temperature, wherein the second preset temperature is greater than the first preset temperature;
  the speed adjusting module is further configured for:
  in response to determination that the selected value is greater than the first preset temperature, adjusting the speed of the air delivered by fresh air ventilator to a first speed, wherein the first speed is greater than zero and less than the set speed; and
  in response to determination that the temperature of the air delivered by the fresh air ventilator is greater than the second preset temperature, adjusting the speed of the air delivered by the fresh air ventilator to the set speed.

6. The control device of claim 5, wherein the speed adjusting module is further configured to:
  determine whether a larger one of the temperature value of the temperature of the air delivered by the fresh air ventilator and the external temperature of the indoor heat exchanger is greater than a first preset temperature value in response to determining that the current speed of the air delivered by the fresh air ventilator is zero;
  adjust the speed of the air delivered by the fresh air ventilator to a first speed in response to determining that the larger one of the temperature value of the temperature of the air delivered by the fresh air ventilator and the external temperature of the indoor heat exchanger is greater than the first preset temperature value;

determine whether the temperature of the air delivered by the fresh air ventilator is greater than a second preset temperature value in response to determining that the current speed of the air delivered by the fresh air ventilator is the first speed; and adjust the speed of the air delivered by the fresh air ventilator to the set speed in response to determining that the temperature of the air delivered by the fresh air ventilator is greater than the second preset temperature value;

wherein the first speed is greater than zero and less than the set speed, and the second preset temperature value is greater than the first preset temperature value.

7. The control device of claim 6, wherein the speed adjusting module is further configured to:

determine whether the temperature of the air delivered by the fresh air ventilator is less than a third preset temperature value in response to determining that the current speed of the air delivered by the fresh air ventilator is the set speed;

adjust the speed of the air delivered by the fresh air ventilator to the first speed in response to determining that the temperature of the air delivered by the fresh air ventilator is less than the third preset temperature value;

determine whether the temperature of the air delivered by the fresh air ventilator is less than a fourth preset temperature value in response to determining that the current speed of the air delivered by the fresh air ventilator is the first speed; and adjust the speed of the air delivered by the fresh air ventilator to zero in response to determining that the temperature of the air delivered by the fresh air ventilator is less than the fourth preset temperature value;

wherein the fourth preset temperature value is less than the third preset temperature value.

8. The control device of claim 6, wherein the speed adjusting module is further configured to set the first speed of the air delivered by the fresh air ventilator based on the temperature of the air delivered by the fresh air ventilator and the set temperature, the speed adjusting module is further configured to:

determine whether a difference between the temperature of the air delivered by the fresh air ventilator and the set temperature is less than a first preset difference;

determine the speed of the air delivered by the fresh air ventilator corresponding to a minimum speed level of the fresh air ventilator as the first speed of the air delivered by the fresh air ventilator in response to determining that the difference between the temperature of the air delivered by the fresh air ventilator and the set temperature is less than the first preset difference;

determine whether the difference between the temperature of the air delivered by the fresh air ventilator and the set temperature is less than or equal to a second preset difference in response to determining that the difference between the temperature of the air delivered by the fresh air ventilator and the set temperature is greater than or equal to the first preset difference, wherein the second preset difference is greater than the first preset difference;

determine that a speed level corresponding to the first speed is two levels lower than a speed level corresponding to the set speed in response to determining that the difference between the temperature of the air delivered by the fresh air ventilator and the set temperature is less than or equal to the second preset difference; and determine that the speed level corresponding to the first speed is one level lower than the speed level corresponding to the set speed in response to determining that the difference between the temperature of the air delivered by the fresh air ventilator and the set temperature is greater than the second preset difference.

9. A fresh air ventilator comprises the control device according to claim 5.

* * * * *